United States Patent [19]
Oudet

[11] 4,155,018
[45] May 15, 1979

[54] MULTIPOLAR STEP MOTOR

[75] Inventor: Claude Oudet, Besancon, France

[73] Assignee: Portescap, La Chaux-de-Fonds, Switzerland

[21] Appl. No.: 827,333

[22] Filed: Aug. 24, 1977

[30] Foreign Application Priority Data

Sep. 3, 1976 [CH] Switzerland ................. 11198/76

[51] Int. Cl.² ........................................ H02K 37/00
[52] U.S. Cl. .................................. 310/49 R; 310/257; 310/156
[58] Field of Search ............... 310/49, 152–156, 310/257

[56] References Cited

U.S. PATENT DOCUMENTS

| 3,754,155 | 8/1973 | Oudet | 310/257 X |
| 3,845,335 | 10/1974 | Oguey | 310/257 X |
| 3,860,842 | 1/1975 | Schwab et al. | 310/49 |
| 3,958,139 | 5/1976 | Oudet | 310/49 |
| 3,999,090 | 12/1976 | Sinnott | 310/49 |

Primary Examiner—Donovan F. Duggan
Attorney, Agent, or Firm—Cushman, Darby & Cushman

[57] ABSTRACT

A multipolar step motor having a rotor with N pairs of alternatively positive and negative magnetic poles arranged thereon with a regular angular spacing therebetween. The motor has two polar members defining an air gap within which the rotor is disposed, at least one of the polar members being configured to define N alternations of the distance between the said member and the rotor. The elements defining the said alternations comprise two groups in which the elements are equally spaced by $2\pi/N$, the two groups being angularly spaced by an angle of $\pi/4N$ one with respect to the other.

11 Claims, 6 Drawing Figures

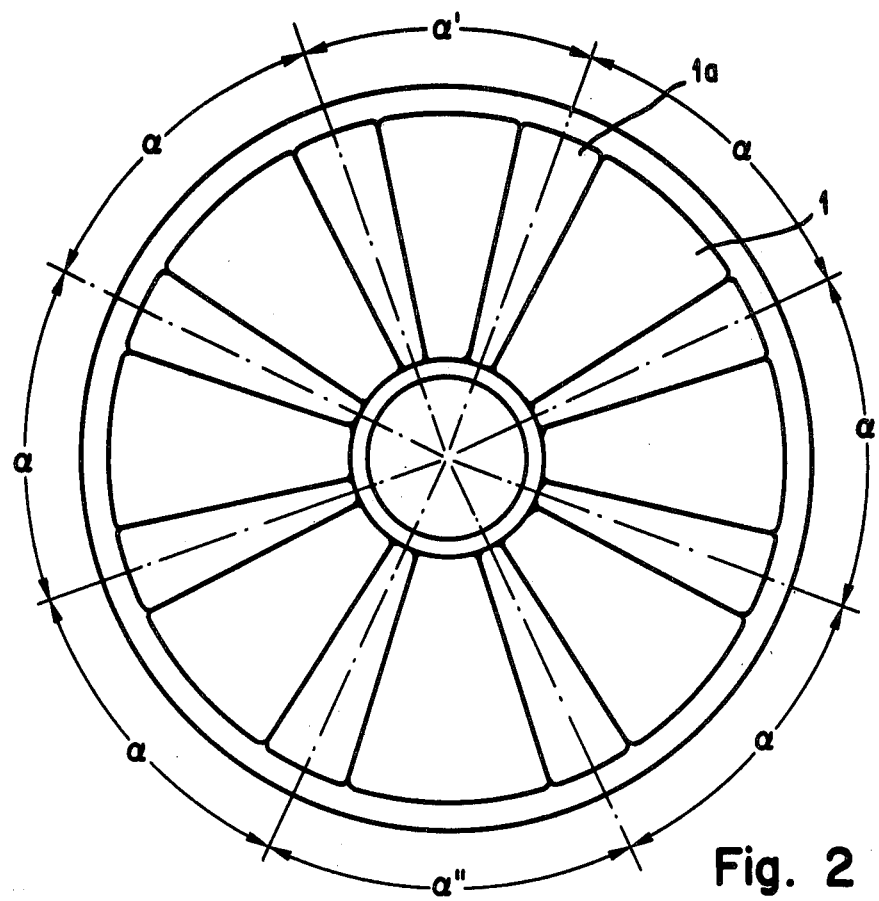
Fig. 2
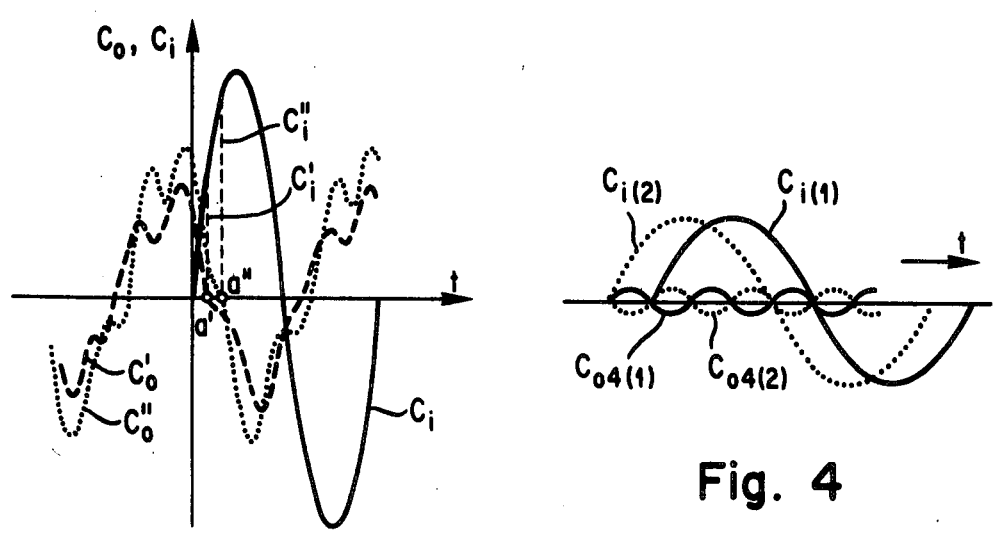
Fig. 3
Fig. 4

MULTIPOLAR STEP MOTOR

BACKGROUND OF THE INVENTION

The present invention relates to a multipolar step motor. In known motors of this type, cooperation between polar members of a stationary magnetic circuit in the airgap of which the rotor is disposed, and poles of the rotor of the motor, results in a torque acting on the rotor having a component $C_1$ due to the current and a residual magneto-static torque $C_0$ defining in particular the positions of stable equilibrium of the rotor. The magneto-static torque $C_0$ generally comprises a harmonic $C_{02}$ having a frequency double than that of the torque due to the current, and a harmonic $C_{04}$ having a frequency quadruple than that of the torque due to the current, whereas the odd harmonics are generally negligible. Methods of reducing or controlling the influence of the harmonic 2 of the residual magneto-static torque are already known. However, the more this harmonic 2 is reduced in the magneto-static torque the more the influence of the harmonic 4 becomes conspicuous and troublesome for the operation of the motor. As will be described below, a high percentage of harmonic 4 with respect to the basic harmonic generally has the effect of bringing the stable equilibrium position of the rotor near to the point where the torque due to the current is nul. Consequently, the torque due to the current available in the rest positions is reduced, this resulting in a corresponding reduction of the useful torque of the motor.

SUMMARY OF THE INVENTION

An object of the present invention is to provide a step motor in which the residual magneto-static torque, which has a frequency quadruple than that of the torque due to the current, is greatly reduced.

To this end, the motor according to the invention is characterized in that the elements of one of the two assemblies which comprise the assembly of pairs of poles of the rotor and the assembly of parts of at least one of the polar members defining alternations of the distance separating said at least one polar member from the rotor, have a regular angular spacing, the elements of the other assembly comprising at least two groups having the same number of elements, within which groups the elements have an angular spacing equal to $2\pi/N$, the said two groups being angularly spaced by an angle of $\pi/4N$ one with respect to the other.

Such arrangement can be adopted in particular in motors in which one of the polar members has N teeth distributed about the axis of the rotor, the other polar member having a uniform surface, and in motors in which each of the two polar parts has teeth distributed about the axis of the rotor. In this latter case, the teeth of one of the polar members may form the said two groups offset one with respect to the other, or each polar member may comprise the said two groups angularly spaced one with respect to the other.

The rotor may be an axially magnetized disc; in this case, the control coil is preferably an elongated cylindrical coil and comprises a core disposed at least approximately in the plane of the rotor, the two ends of the core being connected to the polar members of the stationary magnetic circuit, a particularly advantageous arrangement being that in which the two polar members are symmetrical with respect to a diameter of the disc perpendicular to the axis of the coil.

BRIEF DESCRIPTION OF THE INVENTION

The invention will now be described by way of example with reference to the accompanying drawings, in which:

FIG. 2 is a top view of an empty casing of the motor of FIG. 1;

FIG. 3 is a diagram of the torques which may arise in a motor of the above-mentioned type;

FIG. 4 is a diagram showing the effect of the invention on the harmonics 4 of the magneto-static torque;

DETAILED DESCRIPTION OF PREFERRED EMBODIMENTS

Figure 1:
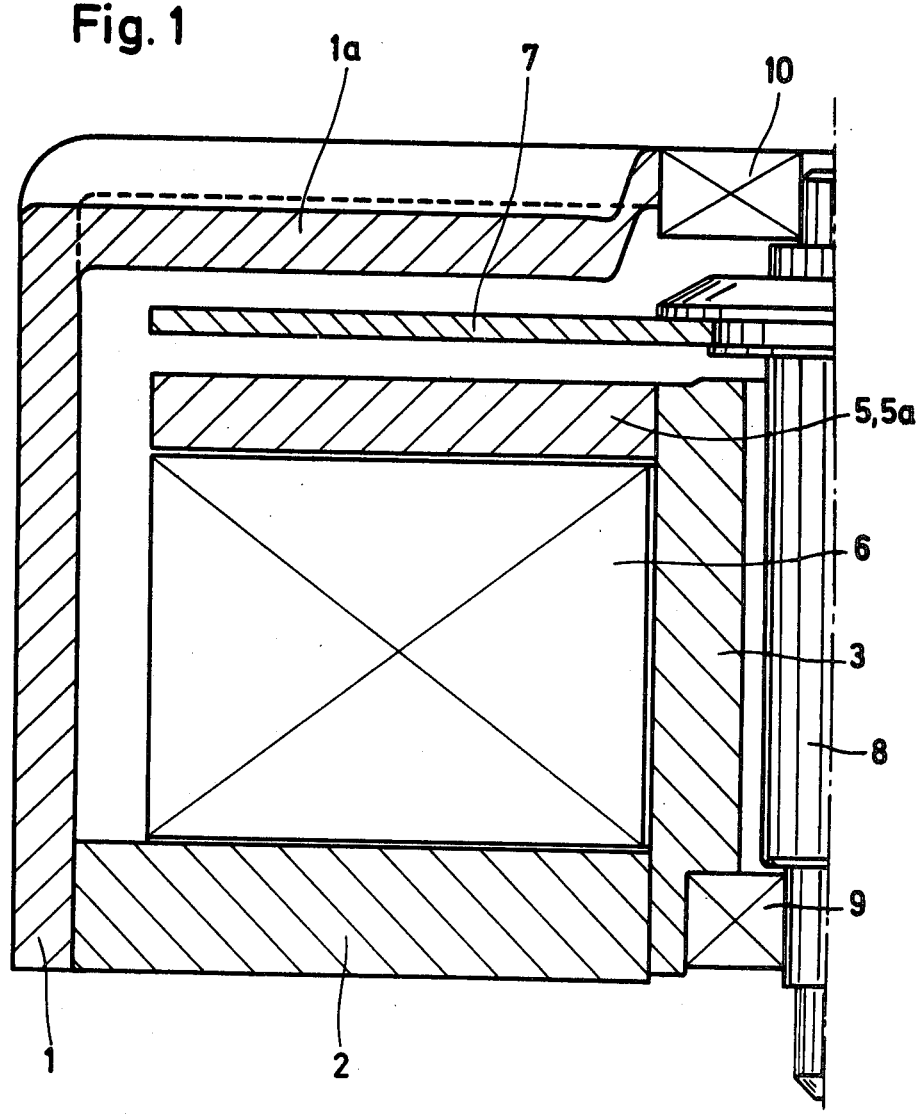
FIG. 1 is one half of an axial cross-sectional view of a step motor.

The motor shown in FIG. 1 has a casing 1 which is generally cylindrical in shape and the bottom of which is provided with radially extending stamped teeth 1a. The opposite side of the casing 1 is substantially closed by an annular member 2 which surrounds the lower part of a central hollow core 3. The upper end of the core 3 is surrounded by another annular disc-shaped member 5 arranged parallel to the annular member 2. The assembly comprising the members 1, 2, 3 and 5 is made of a magnetically permeable material and forms a stationary magnetic circuit of the motor. Around the core 3 a co-axial cylindrical coil 6 is disposed between the members 2 and 5 to control the motor by means of electric pulses applied to this coil. Parts 1a and 5 of the stationary magnetic circuit form polar members which define a variable-height air gap therebetween. For simplicity, it is assumed that the surface of the polar member 5 is plane, but according to another embodiment it could also have radial teeth 5a cut in the member 5.

The rotor of the motor of FIG. 1 comprises a thin disc 7 supported by a shaft 8 which passes through a central opening in the core 3 and is carried by bearings 9 and 10 mounted at the ends axially opposite to the casing of the motor. The disc 7 is axially magnetized so as to have N pairs of poles alternatively positive and negative on the surfaces of the disc. These poles, for example, are arranged to have a regular angular distribution about the axis of the rotor.

FIG. 2 shows the toothing of the bottom of the casing 1 of the motor of FIG. 1 when viewing the empty casing from below, i.e., when the casing is considered as a separate member. The radially oriented teeth 1a, for example eight in number, have a variable angular distribution. More particularly, the eight teeth of this polar member are divided into two groups each of which comprises four teeth spaced from one another by an angle $\beta = 2\pi/N$ within each group. With $N=8$, $\alpha$ is equal to 45°. These two groups of teeth are angularly spaced from one another so that the end teeth of the two groups define an angle $\alpha' < \alpha$ on the one side and an angle $\alpha'' > \alpha$ on the other side. The angular distance is chosen so that the difference between $\alpha$ and $\alpha'$, and $\alpha''$ and $\alpha$ is equal to $\alpha/8$. In the present case, $\alpha' = 39° 23'$ and $\alpha'' = 50°37'$.

FIG. 3 shows by way of explanation the variation of the torque due to the current $C_i$ and the magneto-static torque $C_0$ as a function of the angle of rotation in a motor of the above described type in two different cases of reduction of the harmonic 4 of the torque $C_0$. In the first case, the motor has a magneto-static torque $C_0'$ which defines by its passing past 0, a stable equilibrium position a' of the rotor very near to the origin. This motor has a relatively high percentage of harmonic 4 and the value $C_i'$ of the torque $C_i$ due to the current is small at the stable equilibrium point.

In the second case, the motor has a smaller percentage of harmonic 4, the magneto-static torque having the form $C_0''$. This magneto-static torque defines a stable equilibrium point a" and it will be noted that the torque $C_i''$ due to the current is considerably greater in this position.

FIG. 4 illustrates the influence of the arrangement of the teeth according to FIG. 2 on the appearance of the harmonic 4 in the motor according to the invention. The component of the torque due to the current $C_{i\,(1)}$ produced by one of groups of four equidistant teeth and the torque due to the current $C_{i\,(2)}$ produced by the other group of four teeth will be considered separately. These two groups of teeth are spaced one eighth of the period, which is illustrated by the solid and dashed line curves. Consequently, the quadruple-frequency components $C_{04(1)}$ and $C_{04(2)}$ are in phase opposition and annul each other. The vectorial summation of the components $C_{i(1)}$ and $C_{i(2)}$ shows that the torque due to the current mantains substantially the same absolute value in the case of the slightly asymmetric arrangement of the teeth compared with the conventional purely symmetrical arrangement.

Figure 5:
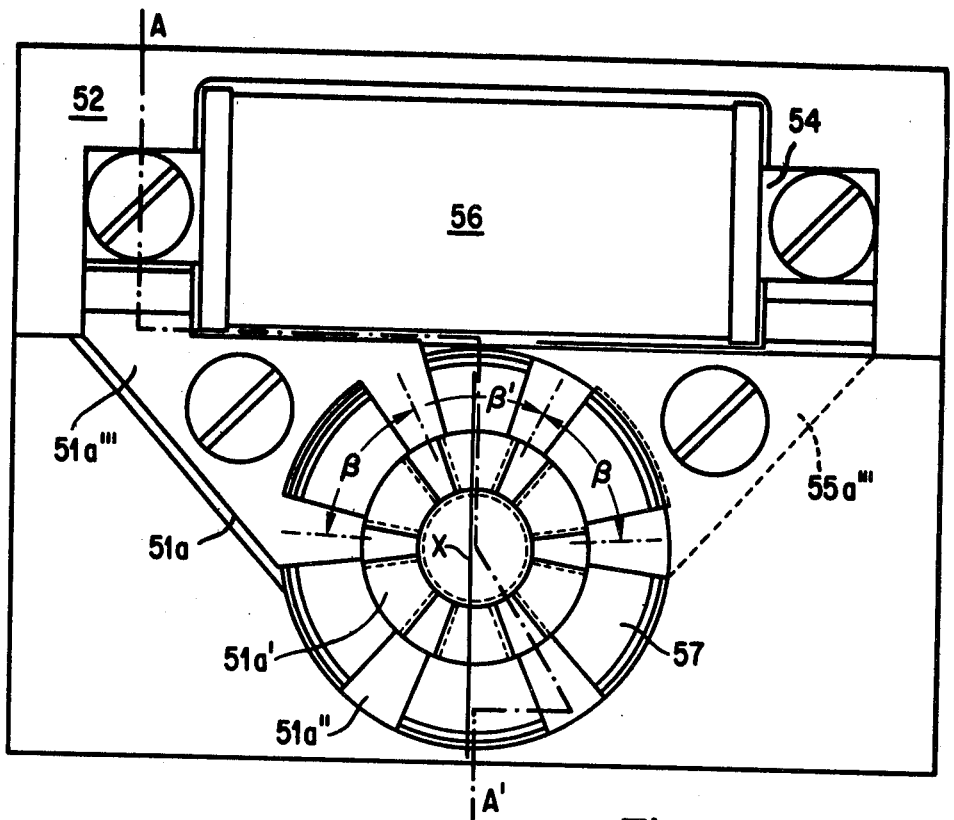
FIG. 5 is a view from below of a second embodiment of a step motor having an eccentric coil.
Figure 6:
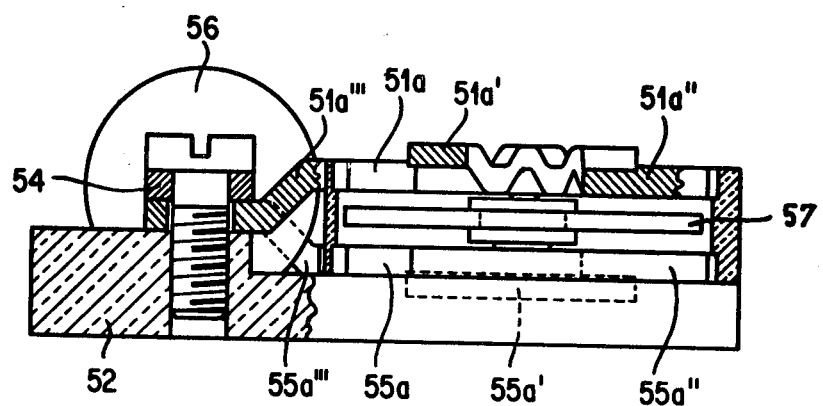
FIG. 6 is a cross-sectional view taken along the lines AA' of FIG. 5.

FIGS. 5 and 6 show another embodiment of a step motor in which the electrical control coil 56 is laterally arranged with respect to the rotor. The latter comprises a flat disc 57 mounted for rotation in the air gap defined by two polar members 51a and 55a arranged one opposite the other. Each polar member has an annular portion 51a' and 55a', respectively, coaxial with the rotor and radially extended by cut-out teeth 51a" and 55a", which make it possible to generate the torque due to the current by cooperating with the magnetized parts of the rotor 57. The rotor 57 is magnetized, at least in its annular part arranged opposite to the cut teeth of the stator, similarly to the rotor of FIG. 1, the number of pairs of poles being N=6 in the example shown. Each polar member 51a and 55a has an arm which extends two successive teeth and established connection with a respective end of the core 54 of the coil 56. To this end, the arms 51a''' and 55a''' are bent at their ends so as to support their toothing at a suitable distance from one another to form the air gap of the motor. The assembly of the stationary magnetic circuit 51a, 54 and 55a is fixed and mounted on a frame 52 consisting of a non-magnetic material which also contains the bearing or bearings, not shown, carrying the shaft of the rotor.

The teeth of each member 51a and 56a are divided into two groups of three cut teeth, these two groups being spaced one with respect to the other by one eighth of pitch $\beta$, $\beta = 2\pi/6 = 60°$. Accordingly, the angle $\beta'$ formed, on the one side, between the external teeth of the two groups is equal to 52°30' in the example shown. The effect of this angular distance between the two groups of teeth of each polar member is the same as that described above in connection with FIG. 4 and the motor of FIG. 1.

It should be noted that the arrangement according to FIG. 5 makes it possible to obtain the polar member 51a as a whole including the arm 51a''' in a single piece which has a shape exactly identical to that of the polar member 55a, the latter being simply rotated through 180° about the axis X representing a diameter of the rotor in the plane of symmetry of the toothing of the piece 51a. This is an important advantage in the manufacture of the motor.

Besides the angular displacement of the two groups of teeth within a polar member, it is also possible, in a motor having two opposite stator toothings, to shift the assembly of each of the two opposite toothings one with respect to the other through one eighth of the pitch in order to obtain a supplementary effect of phase opposition of two groups of harmonics 4 of the residual magneto-static torque. Such an arrangement, however, requires very good symmetry between the two polar members with respect to the poles of the rotor in order not to increase the influence of one of the two groups, i.e. one of the two stators. The measures of angular spacing within each toothing and between the toothings as a whole can be combined.

Other modifications comprise formation of regularly spaced toothings and angularly shifting on the rotor the two groups of pairs of poles in a manner similar to that described in connection with the teeth 1a, for example, of FIG. 1. The central part of the polar members of the motor of FIG. 5 may have a notched configuration in order to form a second range of central teeth to produce a magneto-static locking torque as described, for example, in the German patent application DT-OS 24 52 131.

I claim:

1. A multipolar step motor comprising a stationary magnetic circuit defining an air gap, a rotor disposed in the air gap and having N pairs of alternately positive and negative poles arranged about an axis of rotation thereof, said air gap of the stationary magnetic circuit being formed by two opposite polar members at least one of which is configured so that the distance between it and the rotor alternately varies N times throughout said axis of rotation, an electrical control coil connected to the magnetic circuit, wherein the elements of one of the two assemblies which comprise the assembly of pairs of poles of the rotor and the assembly of parts of at least one of the polar members defining alternations of the distance separating said at least one polar member from the rotor, have a regular angular spacing, the elements of the other assembly comprising at least two groups having the same number of elements, within which groups the elements have an angular spacing equal to $2\pi/N$, the said two groups being angularly spaced by an angle of $\pi/4N$ one with respect to the other.

2. A step motor as claimed in claim 1, wherein one of the polar members has teeth distributed about the axis of the rotor, the other polar member having a uniform surface.

3. A step motor as claimed in claim 1, wherein each of the two polar members has teeth distributed about the axis of the rotor, the teeth of one of the polar parts form the said two groups of elements.

4. A step motor as claimed in claim 1 wherein said two polar members have teeth distributed about the axis of the rotor, each polar part comprising said two groups of elements.

5. A step motor as claimed in claim 1, wherein said two polar members have the same configuration and are angularly spaced through an angle $\pi/4N$ one with respect to the other.

6. A step motor as claimed in claim 1, wherein said rotor comprises an axially magnetized disc, said two polar members being arranged symmetrical with respect to a diameter of the disc of the rotor.

7. A step motor as claimed in claim 6 wherein said control coil is an elongated cylindrical coil the axis of which is parallel to the plane of the disc of said rotor, the coil comprising a core the ends of which are magnetically connected to the polar members of said stationary magnetic circuit, the axis of symmetry of siad polar parts being perpendicular to an axial plane of the coil.

8. A step motor as claimed in claim 7, wherein each polar member has N teeth arranged in a plane parallel to the disc of the rotor, said N teeth being connected to an end of the core by means of an arm.

9. A step motor as claimed in claim 8, wherein said arm extends on the outer peripheral side of at least one tooth.

10. A step motor as claimed in claim 8, wherein the teeth are connected to one another by means of a central part.

11. A step motor as claimed in claim 10, in which the disc has an axially-magnetized central annular zone so as to form alternatively positive and negative poles, said central part of each polar member forming an inner toothing having teeth regularly arranged about the axis of the rotor.

* * * * *